United States Patent
Giara et al.

(10) Patent No.: US 12,026,508 B2
(45) Date of Patent: Jul. 2, 2024

(54) METHODS FOR AUTOMATED CONFIGURATION MANAGEMENT IN PLATFORM-AS-A-SERVICE ENVIRONMENTS AND DEVICES THEREOF

(71) Applicant: RapDev LLC, Boston, MA (US)

(72) Inventors: Jonathan James Giara, Dorchester, MA (US); Dor David Vaknin, Boston, MA (US); Lyndsey Cohen, Jupiter, FL (US)

(73) Assignee: RAPDEV LLC, Boston, MA (US)

( * ) Notice: Subject to any disclaimer, the term of this patent is extended or adjusted under 35 U.S.C. 154(b) by 164 days.

(21) Appl. No.: 17/888,101

(22) Filed: Aug. 15, 2022

(65) Prior Publication Data

US 2024/0053981 A1 Feb. 15, 2024

(51) Int. Cl.
*G06F 8/71* (2018.01)
*G06F 8/65* (2018.01)
*G06F 16/23* (2019.01)

(52) U.S. Cl.
CPC .............. *G06F 8/71* (2013.01); *G06F 8/65* (2013.01); *G06F 16/2358* (2019.01)

(58) Field of Classification Search
CPC ........... G06F 8/71; G06F 16/2358; G06F 8/65
See application file for complete search history.

(56) References Cited

U.S. PATENT DOCUMENTS

| | | | | |
|---|---|---|---|---|
| 10,007,597 B2 * | 6/2018 | Barnett | ............... | G06F 11/3672 |
| 11,354,102 B1 * | 6/2022 | Nordqvist | ................ | G06F 8/51 |
| 11,586,437 B1 * | 2/2023 | Tripp | ........................ | G06F 9/54 |
| 2010/0185701 A1 * | 7/2010 | Ramamurthi | ........... | G06F 16/86 707/E17.005 |
| 2011/0314403 A1 * | 12/2011 | Yan | .................... | G06Q 10/0639 715/772 |
| 2013/0290830 A1 * | 10/2013 | Shmulevich | ........... | G06F 40/143 715/234 |
| 2017/0139758 A1 * | 5/2017 | Boshev | ................... | G06F 16/22 |
| 2018/0113862 A1 * | 4/2018 | Glover | .............. | G06F 16/1873 |
| 2022/0050839 A1 * | 2/2022 | Stegmaier | ............. | G06F 16/215 |
| 2022/0091830 A1 * | 3/2022 | Ionescu | ...................... | G06F 8/71 |
| 2023/0028620 A1 * | 1/2023 | Bowman | ............... | G06F 16/972 |
| 2023/0393825 A1 * | 12/2023 | Bandaru | .................. | G06F 8/75 |
| 2024/0012632 A1 * | 1/2024 | Deshmukh | ................ | G06F 8/71 |

* cited by examiner

*Primary Examiner* — Lewis A Bullock, Jr.
*Assistant Examiner* — Theodore E Hebert
(74) *Attorney, Agent, or Firm* — Troutman Pepper Hamilton Sanders LLP

(57) ABSTRACT

Methods, non-transitory computer readable media, and platform-as-a-service (PaaS) server devices are disclosed that obtain commit metadata from a version control system (VCS) via communication network(s). The VCS is located on-premises and is associated with an enterprise and the commit metadata comprises an indication of file(s) committed to the VCS by enterprise user(s). A determination is made that at least a portion of the indication for at least one of the file(s) matches a stored pattern. The one of the file(s) comprises a configuration file. Contents of the configuration file are retrieved from the VCS via the communication network(s). The contents comprise configuration data associated with information technology infrastructure associated with the enterprise. A database associated with an instance of a platform is updated to include at least a portion of the configuration data. The platform instance is associated with the enterprise and hosted within a PaaS environment.

14 Claims, 6 Drawing Sheets

```
business_applications:
  - name: App1 #mandatory
    business_owner:
      name: Jon
      email: jon@test.com #mandatory if include business_owner
    tech_owner:
      name: GO Integrations
      email: integrations@test.com #mandatory if include tech_owner
    support_group: Service Desk #mandatory
  - name: App2
    business_owner:
      name: Eli
      email: eli@test.com
    tech_owner:
      name: Jon
      email: jon@test.com
    support_group: ServiceNow Access
  - name: App3 microservice:
  name: MicroserviceTest #mandatory
  owned_by: #possible to auto-populate this using Business Application Tech Owner
    name: Alex
    email: alex@test.com #mandatory if include owner
  support_group: Application Development #mandatory
  cloud_service_account: null
  application_services: #list out all of the environments for the microservice
    - environment: prod #mandatory
      tags: #list out all of the key/value pairs that the resources for this deployed microservice are tagged with
        name: Microservice1
    - environment: test
      tags:
        name: Microservice1
        key2: value2
```

METHODS FOR AUTOMATED CONFIGURATION MANAGEMENT IN PLATFORM-AS-A-SERVICE ENVIRONMENTS AND DEVICES THEREOF

FIELD

This technology generally relates to managing information technology infrastructure and, more particularly, to methods and devices for automated configuration management in platform-as-a-service (PaaS) environments.

BACKGROUND

Applications and services are increasingly developed and delivered using cloud-based platforms hosted by Platform-as-a-Service (PaaS) providers. PaaS providers deliver software tools over the Internet, which are hosted on their own hardware infrastructure. The resources of the provided platforms can facilitate efficient application development and deployment in order to shorten the software development lifecycle, provide improved visibility into production environments, and reduce service costs and downtime, among other advantages.

In one example, ServiceNow, Inc. of Santa Clara, CA is a PaaS provider that hosts software and hardware environments to enable enterprises to gain visibility across infrastructure and application services, maintain service health, and optimize cloud service delivery, among other functions. ServiceNow™ provides a configuration management database (CMDB) that brings together formerly siloed data across an enterprise that is required to run information technology (IT) infrastructure and services in order to provide IT operations users improved insight with respect to all the IT resources in the enterprise.

However, ingesting data into PaaS environments is currently a cumbersome and inefficient process. Maintaining a registry of business services today requires a user to login to the ServiceNow™ platform and enter data manually into various fields. More specifically, creating CMDB records is a manual process that is time-consuming, susceptible to error, and results in enterprises extracting reduced value from CMDB solutions. Other types of platforms and provided solutions also suffer from inefficient and/or ineffective data ingestion that reduce the advantages for enterprises utilizing PaaS environments.

BRIEF DESCRIPTION OF THE DRAWINGS

FIG. 5 is an exemplary configuration file; and

DETAILED DESCRIPTION

Figure 1:
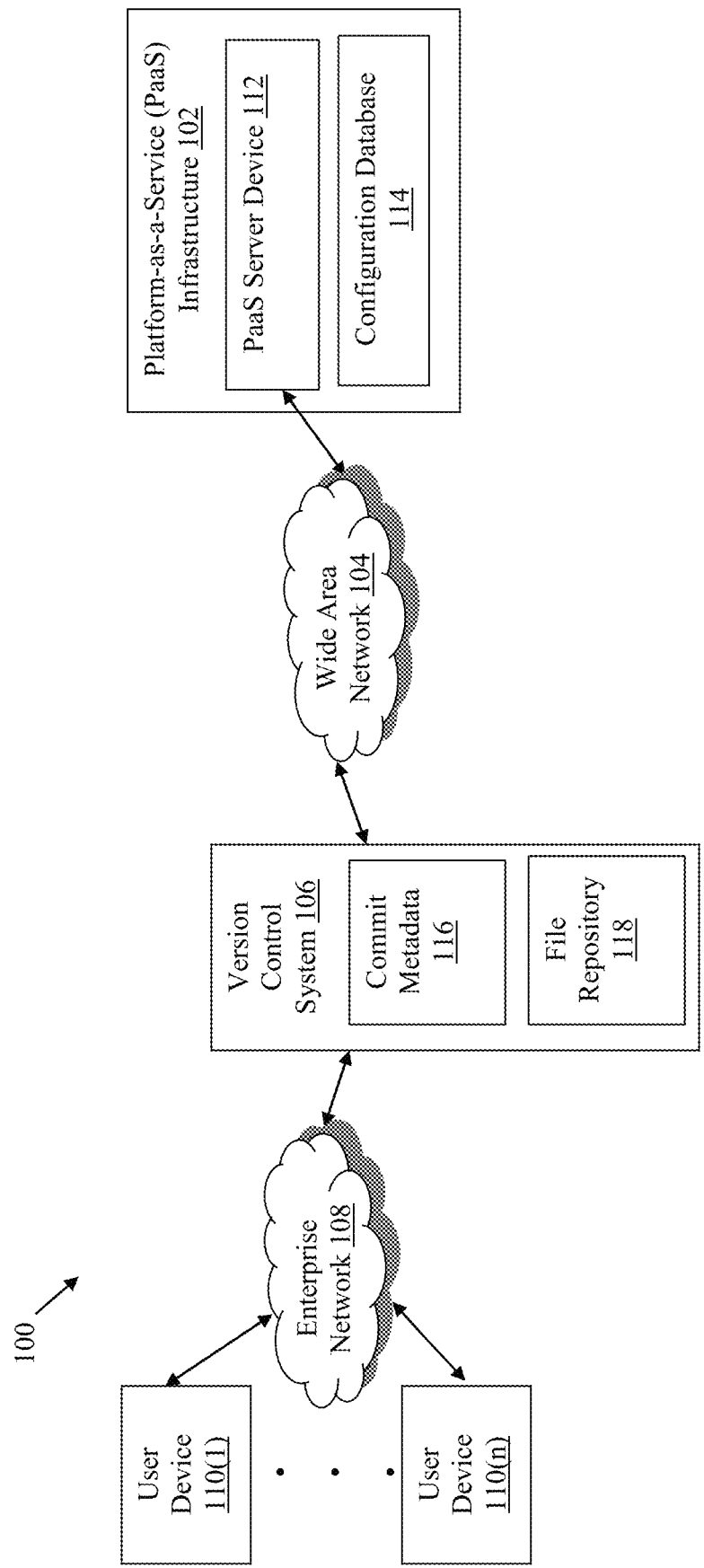
FIG. 1 is a block diagram of an exemplary network environment with a platform-as-a-service (PaaS) server device.

Referring to FIG. 1, an exemplary network environment 100 is illustrated that includes Platform-as-a-Service (PaaS) infrastructure 102 coupled, via wide area network 104, to a version control system 106, which is coupled via an enterprise network 108 to user devices 110(1)-110(n). The network environment 100 may include other network devices such as one or more routers, switches, firewall devices, and/or mid-servers, for example, which are known in the art and thus will not be described herein. This technology provides a number of advantages including methods, non-transitory computer readable media, and PaaS server devices that facilitate efficient, automated data ingestion (e.g., configuration data) in PaaS environments to facilitate more robust information technology (IT) infrastructure visibility and more effective IT infrastructure management.

In this particular example, the PaaS infrastructure 102 includes a PaaS server device 112 and a configuration database 114 and the version control system 106 includes commit metadata 116 and a file repository 118, although the PaaS infrastructure 102 and/or version control system 106 can include other types and/or another number of devices and/or components in other examples. For example, the PaaS infrastructure 102 could have a plurality of PaaS server devices hosting a plurality of platform instances for any number of enterprises.

The user devices 110(1)-110(n), version control system 106, and PasS server device 112 are disclosed in FIG. 1 as dedicated hardware devices. However, one or more of the user devices 110(1)-110(n), version control system 106, or PasS server device 112 can also be implemented in software within one or more other devices in the network environment 100. As one example, the PaaS server device 112 can be implemented in software or as a virtual server hosted by the same hardware device as the configuration database 114, and many other permutations and types of implementations can also be used in other examples.

Figure 2:
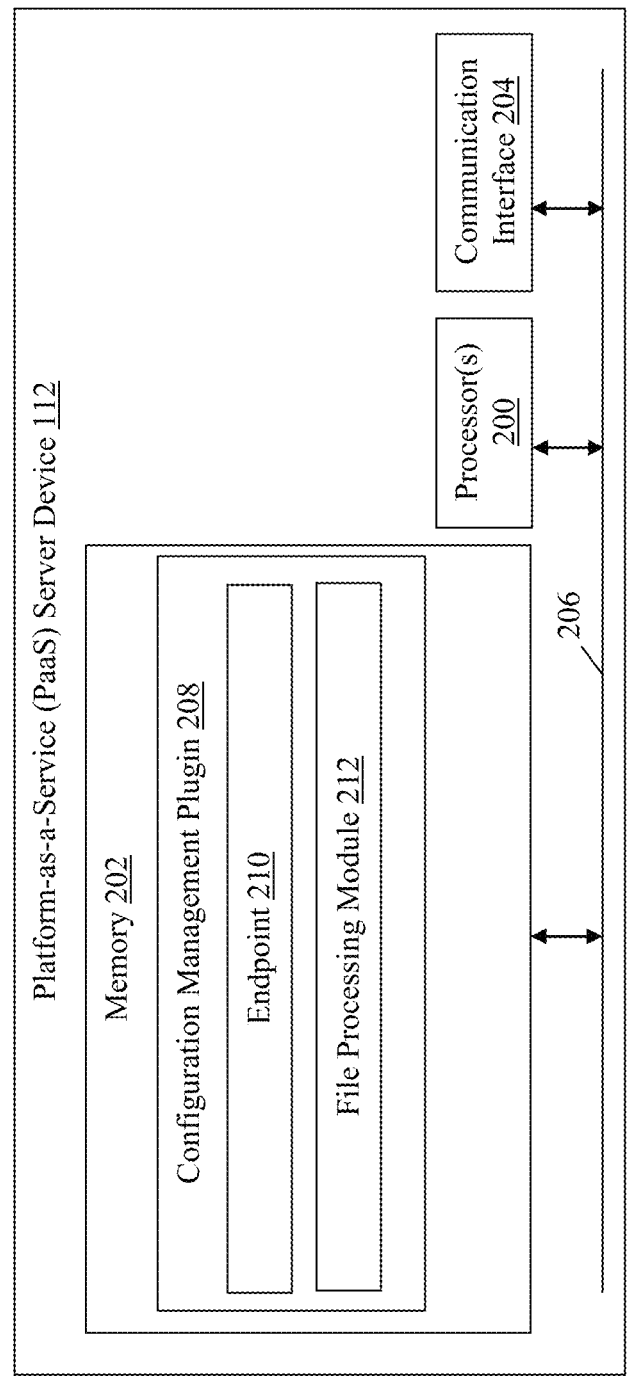
FIG. 2 is a block diagram of an exemplary PaaS server device.

Referring to FIGS. 1-2, the PaaS server device 112 of the network environment 100 may perform any number of functions, including hosting platform instances, provided dashboards and portals for visibility into IT infrastructure, and/or facilitating application and/or service development and deployment, for example. The PaaS server device 112 in this example includes processor(s) 200, a memory 202, and a communication interface 204, which are coupled together by a bus 206, although the PaaS server device 112 can include other types or numbers of elements in other configurations.

The processor(s) 200 of the PaaS server device 112 may execute programmed instructions stored in the memory 202 of the PaaS server device 112 for any number of the functions described and illustrated herein (e.g., with reference to FIGS. 3-6). The processor(s) 200 may include one or more central processing units (CPUs) or general purpose processors with one or more processing cores, for example, although other types of processor(s) can also be used.

The memory 202 of the PaaS server device 112 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 of the PaaS server device 112 can store one or more applications that can include computer executable instructions that, when executed by the PaaS server device 112, cause the PaaS server device 112 to perform actions, such as to transmit, receive, or otherwise process network messages and requests, for example, and to perform other actions described and illustrated below with reference to FIGS. 3-6. The application(s) can be implemented as components of other applications, operating system extensions, and/or plugins, for example.

Further, the application(s) may be operative in a cloud-based computing environment. The application(s) can be executed within or as virtual machine(s) or virtual server(s) that may be managed in a cloud-based computing environment. Also, the application(s), and even the PaaS server device 112 itself, may be located in virtual server(s) running in a cloud-based computing environment rather than being tied to one or more specific physical network computing devices. Also, the application(s) may be running in one or more virtual machines (VMs) executing on the PaaS server device 112. Additionally, in one or more examples of this technology, virtual machine(s) running on the PaaS server device 112 may be managed or supervised by a hypervisor.

In this particular example, the memory 202 of the PaaS server device 112 includes a configuration management plugin 208 with an associated endpoint 210 and a file processing module 212. The configuration management plugin 208 is linked to a particular platform instance (e.g., a ServiceNow™ instance) hosted by the PaaS server device 112 and associated with the enterprise hosting the enterprise network 108. The endpoint 210 has an associated Uniform Resource Locator (URL), which can be used in a webhook by the version control system 106 in some examples. When the webhook is triggered, the version control system 106 sends portion(s) of the commit metadata 116 to the endpoint 210, as described and illustrated in more detail later.

The file processing module 212 parses and analyzes configuration files obtained from the file repository 118 of the version control system 106 that have an identifier in the portion(s) of the commit metadata 116 received at the endpoint 210 that matches a pattern stored by the configuration management plugin 208. The file processing module 212 can be configured to confirm the schema and/or mandatory fields of the configuration files, convert the configuration files (e.g., to a JavaScript Object Notation (JSON) format), extract configuration data from particular fields, and store the extracted configuration data in mapped locations in records of the configuration database 114.

The configuration database 114 (e.g., a ServiceNow™ CMDB) stores configuration and other data for IT infrastructure associated with the enterprise associated with the enterprise network 108 to provide visibility and other utility for IT operations users. The configuration database can be a Structured Query Language (SQL) or NoSQL database in some examples, and other types of databases and other repositories storing other types of data can also be used in other examples. Additionally, the file processing module 212 can perform other functions in other examples, and the configuration management plugin 208 can also be implemented as a module or component, or any other type of software in other examples.

The communication interface 204 of the PaaS server device 112 operatively couples and communicates between the PaaS server device 112 and version control system 106, which are coupled together at least in part by the wide area network (WAN) 104, although other types or another number of communication networks or systems with other types or numbers of connections or configurations to other devices or elements can also be used. By way of example only, the WAN 104 can use TCP/IP over Ethernet and industry-standard protocols, although other types or numbers of protocols or communication networks can be used. The WAN 104 can include the Internet and can employ any suitable interface mechanisms and network communication technologies including, for example, Ethernet-based Packet Data Networks (PDNs).

While the PaaS server device 112 is illustrated in this example as including a single device, the PaaS server device 112 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the PaaS server device 112. Additionally, one or more of the devices that together comprise the PaaS server device 112 in other examples can be standalone devices or integrated with one or more other devices or apparatuses.

The version control system 106 of the network environment 100 tracks and manages changes to software code (e.g., application and/or program files containing source code) and other data, including configuration files in this particular example. The software code is stored in the file repository 118 and the commit metadata 116 stores contextual information regarding changes made by users of the user devices 110(1)-110(n) to the file repository 118. The version control system can be a Git SCM available from Software Freedom Conservancy, Inc. of Brooklyn, NY in some examples, although any other type of version control system can also be used.

The version control system 106 in this example includes processor(s), a memory, and a communication interface, which are coupled together by a bus or other communication link, although other numbers and types of network devices could be used. The version control system 106 in this example processes messages received from the user devices 110(1)-110(n) and the PaaS server device 112 related to hosted software code files. The version control system 106 may be hardware or software or may represent a system with multiple servers in a pool, which may include internal or external networks.

The processor(s) of the version control system 106 may execute programmed instructions stored in the memory of the version control system 106 for any number of the functions described and illustrated herein (e.g., with reference to FIGS. 3-6). The processor(s) may include one or more CPUs or general purpose processors with one or more processing cores, for example, although other types of processor(s) can also be used.

The memory of the version control system 106 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Accordingly, the memory of the version control system 106 can store one or more applications that can include computer executable instructions that, when executed by the version control system 106, cause the version control system 106 to perform actions, such as to transmit, receive, or otherwise process network messages and requests, for example, and to perform other actions described and illustrated below with reference to FIGS. 3-6. The application(s) can be implemented as components of other applications, operating system extensions, and/or plugins, for example.

The communication interface 204 of the version control system 106 operatively couples and communicates between the version control system 106 and the PaaS server device 112 and the user devices 110(1)-110(n), which are coupled together at least in part by the WAN 104 and the enterprise network 108, respectively, although other types or another number of communication networks or systems with other types or numbers of connections or configurations to other devices or elements can also be used. By way of example only, the enterprise network 108 can be a local area network (LAN) that uses TCP/IP over Ethernet and industry-standard protocols, although other types or numbers of protocols or communication networks can be used.

Accordingly, the enterprise network 108 can employ any suitable interface mechanisms and network communication technologies including, for example, Ethernet-based Packet Data Networks (PDNs). While the version control system 106 is illustrated in FIG. 1 as an on-premises system coupled to the enterprise network, which may be hosted in a data center, for example, the version control system 106 can be cloud-based or deployed elsewhere in the network environment 100 in other examples.

Each of the user devices 110(1)-110(n) of the network environment 100 in this example includes any type of computing device that can exchange network data, such as mobile, desktop, laptop, or tablet computing devices, virtual machines (including cloud-based computers), or the like. Each of the user devices 110(1)-110(n) in this example includes a processor, a memory, and a communication interface, which are coupled together by a bus or other communication link (not illustrated), although other numbers or types of components could also be used.

Each of the user devices 110(1)-110(n) may run interface applications, such as standard web browsers or standalone client applications, which may provide an interface to communicate with the version control system 106 via the enterprise network 108 in order to make changes to software code in the file repository 118 and to commit those changes. Each of the user devices 110(1)-110(n) may further include a display device, such as a display screen or touchscreen, or an input device, such as a keyboard or mouse, for example (not illustrated).

Although the exemplary network environment 100 with the user devices 110(1)-110(n), version control system 106, PaaS server device 112, enterprise network 108, and WAN 104 are described and illustrated herein, other types or numbers of systems, devices, components, or elements in other topologies can be used. For example, user devices associated with IT operations users associated with the enterprise may be included in the network environment 100 and configured to communicate with a platform instance associated with the enterprise and hosted by the PaaS server device 112 in order to obtain information and visibility regarding enterprise IT infrastructure. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the user devices 110(1)-110(n), version control system 106, or PaaS server device 112, for example, may be configured to operate as virtual instances on the same physical machine. In other words, one or more of the user devices 110(1)-110(n), version control system 106, or PaaS server device 112 may operate on the same physical device rather than as separate devices communicating through enterprise network 108 and/or WAN 104. Additionally, there may be more or fewer user devices, version control systems, or PaaS server devices, than illustrated in FIG. 1.

The examples of this technology may also be embodied as one or more non-transitory computer readable media having instructions stored thereon, such as in the memory 202, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that are described and illustrated herein.

Figure 3:
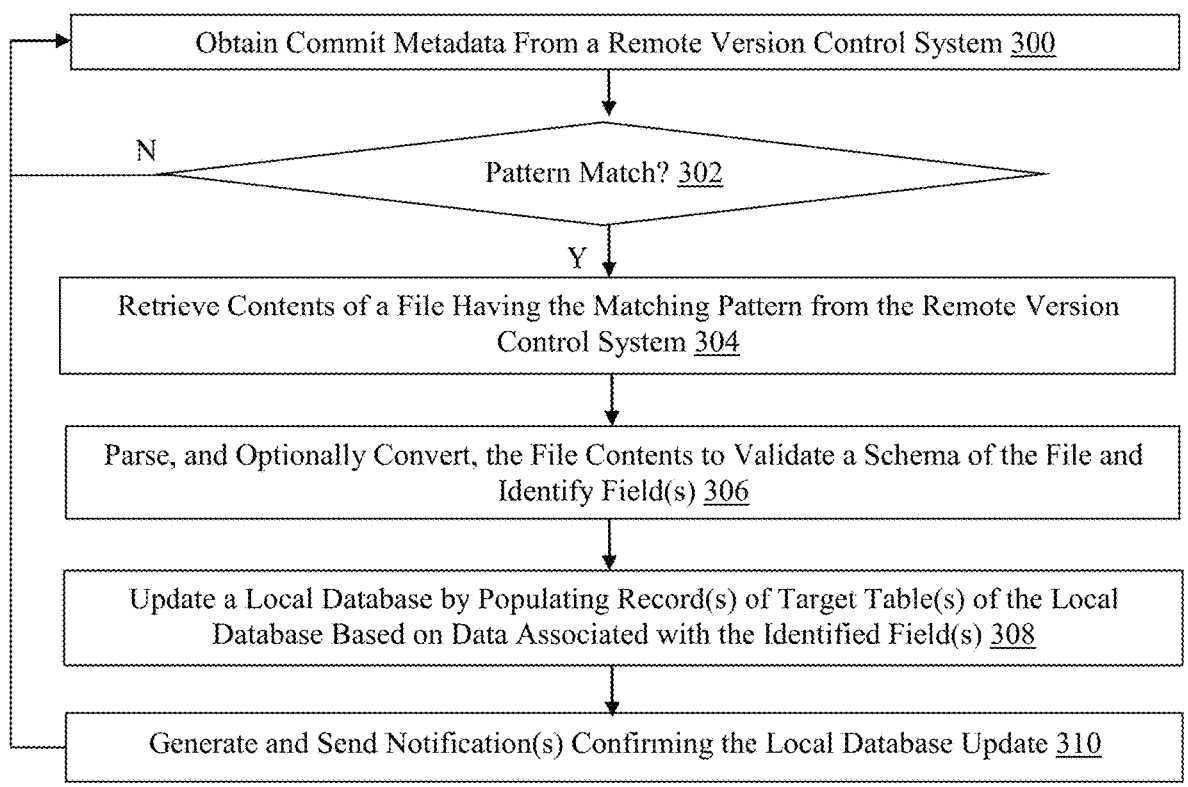
FIG. 3 is a flowchart of an exemplary method for automated configuration management in PaaS environments.

Referring to FIG. 3, a flowchart of an exemplary method for automated configuration management in PaaS environments is illustrated. In step 300 in this example, the PaaS server device 112 executing the configuration management plugin 208 obtains commit metadata 116 from the version control system 106, which is remote with respect to the PaaS server device 112 as it is coupled to the PaaS server device 112 via the WAN 104 and is disposed on-premises within the enterprise network 108 in this particular example. The commit metadata 116 can be stored in the memory of the version control system 106 in a database or other repository separate from, or the same as, the file repository 118, for example.

The PaaS server device 112 can obtain the commit metadata 116 via a "push" from a webhook triggered at the version control system 106 or via a "pull" via polling by the PaaS server device 112 using an Application Programming Interface (API) provided by the version control system 106. As explained earlier, the webhook can be associated with the endpoint 210 and can be triggered based on satisfaction of particular rule(s). For example, a rule can be as broad as triggering the webhook whenever a commit to the file repository 118 is initiated, although other and/or more narrow rule(s) can also be used in other examples.

In other examples, the PaaS server device 112 uses the API to request the commit metadata 116 via a request over the WAN 104. In these examples, the PaaS server device 112 can be configured to submit the request periodically, following satisfaction of stored rule(s), and/or when manually initiated by a user associated with the enterprise, for example. The request can be for a portion of the commit metadata 116 associated with a recent historical time period (e.g., since the last request for commit metadata 116 was submitted to the version control system 106). Other methods for obtaining the commit metadata 116 can also be used in other examples.

In step 302, the PaaS server device 112 determines whether any file (e.g., a configuration file in the file repository 118) indicated in the commit metadata 116 has an identifier that matches a stored pattern. The stored pattern can be automatically determined, a default value, or provided to, and used by, users of the user devices 110(1)-110(n) as a naming convention when those users store particular files (e.g., configuration files) in the file repository 118, for example. Accordingly, the commit metadata 116 includes information regarding all of the files maintained and tracked by the version control system 106 associated with each commit. In this particular example, the PaaS server device 112 determines in step 302 whether the commit(s) associated with the commit metadata 116 obtained in step 300 included a configuration file (i.e., a file having the matching pattern) based on the obtained commit metadata 116, although other types of files can be identified in step 302.

The pattern can include a file name and/or extension, a branch to which a particular file was committed, and/or any other portion of the commit metadata 116. For example, the pattern can be a ".yaml" file extension or a "now.yaml" file name suffix such that an identifier of "config-now.yaml" in the commit metadata 116 would match the stored pattern. Accordingly, the pattern in this example corresponds with a configuration file in the file repository 118. A portion of the indication of that configuration file in the obtained commit metadata 116 includes and matches the stored pattern. In this particular example, the configuration file is a data-serialization language file (e.g., a .yaml file), although other types of configuration files (e.g., JSON files), and any other type of file, can also be used in other examples.

Accordingly, if the PaaS server device 112 determines that none of the indications of files in the obtained commit metadata 116 has a matching pattern, then the No branch is taken back to step 300 and the PaaS server device 112 subsequently obtains additional commit metadata 116 in a subsequent iteration. However, if the PaaS server device 112 determiners in step 302 that at least one of the indications of files in the obtained commit metadata 116 has a matching pattern, then the Yes branch is taken to step 304.

In step 304, the PaaS server device 112 retrieves contents of the file having the identifier that matches the pattern from the version control system 106. The PaaS sever device 112 can retrieve the contents of the configuration file in this example from the file repository 118 via a request submitted over the WAN 104 using an API provided by the version control system 106, although other methods for retrieving the contents of the file can also be used. The request can be for the file contents of the file associated with the identifier matching the stored pattern.

Accordingly, in the above example, the PaaS server device 112 may submit a request to the version control system 106 API for the contents of the "config-now.yaml" file from the file repository 118. In response in this example in which the requested file is a .yaml file, the version control system 106 may return via the WAN 104 a binary large object (BLOB) that includes the contents of that configuration file. The configuration file could have been modified via the most recent commit by a user of one of the user devices 110(1)-110(n) to change a configuration of enterprise IT infrastructure, for example. Other types of files and/or objects can also be used in other examples.

In step 306, the PaaS server device 112 parses the file contents to validate a schema of the configuration file, for example, and identify field(s). Optionally, if the PaaS server device 112 is unable to validate a schema of the retrieved file contents, or mandatory field(s), for example, are missing in the file contents, the PaaS server device 112 may generate an alert or other notification, or may disregard the retrieved contents and proceed back to step 300, for example. Optionally, the PaaS server device 112 can convert the retrieved file contents. In the above example in which the configuration file is a .yaml file, the PaaS server device 112 may convert the file contents to a JSON format for compatibility with the platform, although other types of conversions can also be performed in step 306.

In step 308, the PaaS server device 112 updates a local database (e.g., the configuration database 114, which is local to the PaaS infrastructure 102) by populating record(s) of target table(s) of the local database based on data associated with identified fields. In addition to determining the presence of mandatory fields in step 306, the PaaS server device 112 can identify fields that correspond with key, table, column, and/or row names in the local database in order to map the configuration data, for example, in the file contents. Based on the mapping, the PaaS server device 112 stores and/or replaces data in the local database with the appropriate file contents associated with the corresponding fields and/or generates relationships between records in the local database.

Optionally, the PaaS server device 112 can use tags (i.e., key/value pairs) in the file contents to automatically perform tag-based service mapping in examples in which such mapping is facilitated by the PaaS provider (e.g., ServiceNow™) associated with the PaaS server device 112. In some examples, the tags may not be explicitly defined in the configuration file contents, but the PaaS server device 112 is preconfigured with stored key data indicative of keys expected to be present for particular configuration items in the configuration file contents. For example, this data can include a name or service ID, among other types of information, which can be matched by the PaaS server device 112 and used to create tag-based application services based on an analysis of all possible environments for the matches.

In step 310, the PaaS server device 112 generates and sends notification(s) confirming the local database update performed in step 308. The notification(s) can be generated and sent based on stored contact information. Accordingly, the notification(s) can be e-mails, Short Message Service (SMS) messages, or a message via an enterprise messaging program (e.g., Slack available from Slack Technologies, LLC of San Francisco CA), for example, although any other type of notification can also be used. The notification can include confirmation data associated with the database update (e.g., information regarding the configuration change associated with the database update). Subsequent to generating and sending the notification(s), the PaaS server device 112 proceeds back to step 300 and obtains additional commit metadata 116 in a subsequent iteration after waiting for the next scheduled poll or following the triggering of a webhook, for example. In other examples, one or more of steps 300-310 can be performed in a different order and/or in parallel for any number of platform instances.

Figure 4:
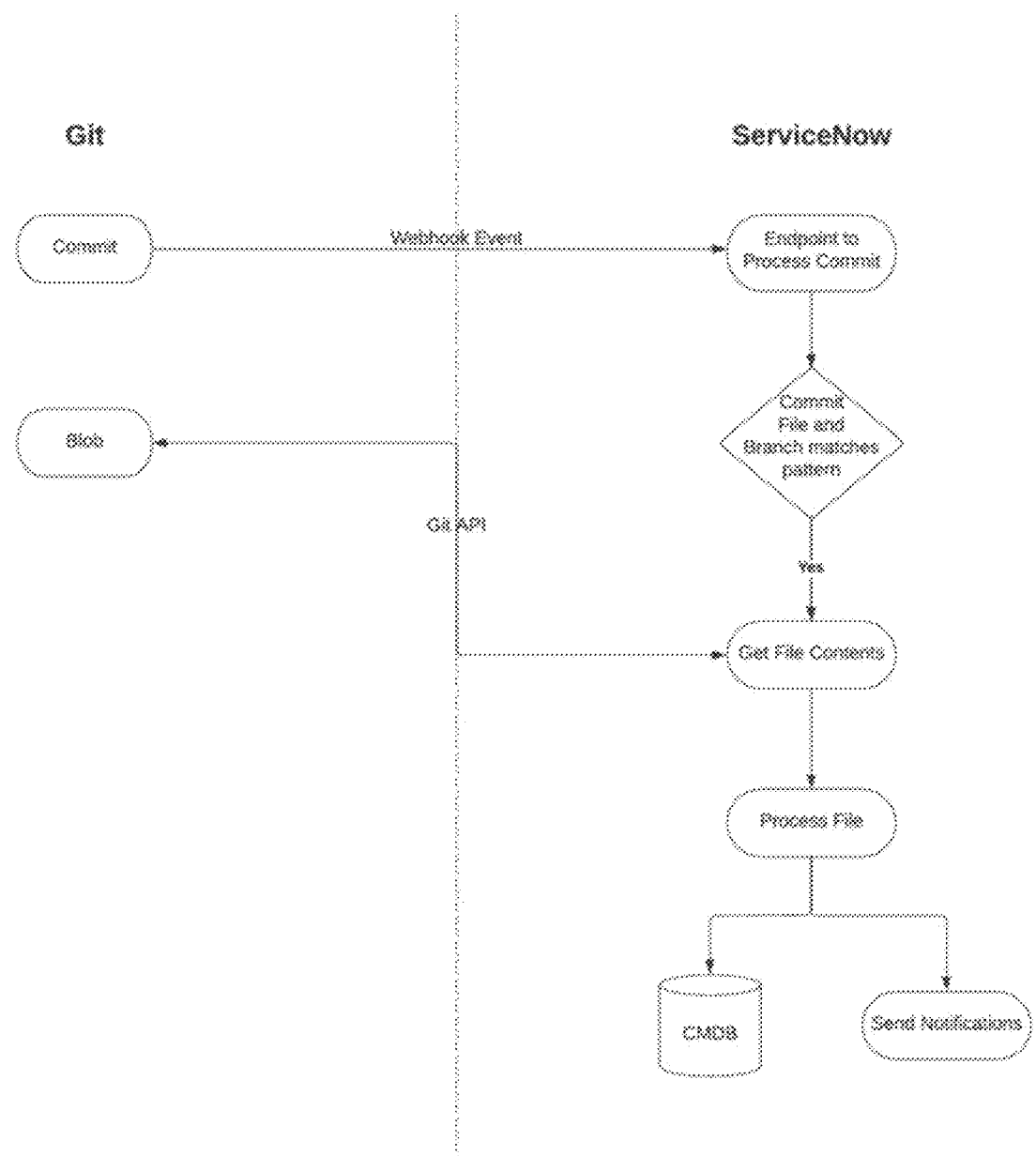
FIG. 4 is a flow diagram of an exemplary method for automated configuration management in PaaS environments.

Referring to FIG. 4, a flow diagram of an exemplary method for automated configuration management in PaaS environments is illustrated. In this particular example, the PaaS server device 112 hosts a ServiceNow™ instance for an enterprise. The enterprise hosts a version control system 106, which is a Git SCM repository in this particular example. In this example, the version control system 106 determines that a commit has occurred, which triggers a webhook event and causes the version control system 106 to send commit metadata 116 associated with the commit to the endpoint 210 having a URL previously stored by the version control system 106 as associated with the webhook.

The PaaS server device 112, optionally executing the configuration management plugin 208, then processes the commit metadata 116 by parsing the commit metadata 116 to determine whether an indication of a file in the commit metadata matches a stored pattern. In this particular example, the PaaS server device 112 also confirms a match of a particular branch with the stored pattern or another stored pattern.

Since the PaaS server device 112 determines there is a match, the Yes branch is taken and the PaaS server device 112 retrieves file contents from the file repository 118 for the file having the matching pattern. The PaaS server device 112 retrieves the file contents by sending the file identified (e.g., file name and GIT branch) to the version control system 106 using an API call. In response, the version control system 106 sends a BLOB with the file contents to the PaaS server device 112. In this particular example, the file is a configuration file and the file contents include configuration data for IT infrastructure associated with the enterprise.

Referring to FIG. 5, an exemplary configuration file 500 is illustrated. In this example, the configuration file defines configurations of business applications including the application names, the business owners, the technology owners, and the associated support groups. Additionally, the configuration file 500 defines configuration data for a microservice including the name, owner, contact information, support group, cloud service account, and the environments for the microservice. In this example, production (i.e., "prod") and test environments are defined and associated with tags (i.e. key/value pairs) to facilitate tag-based service mapping for the associated resources.

Figure 6:
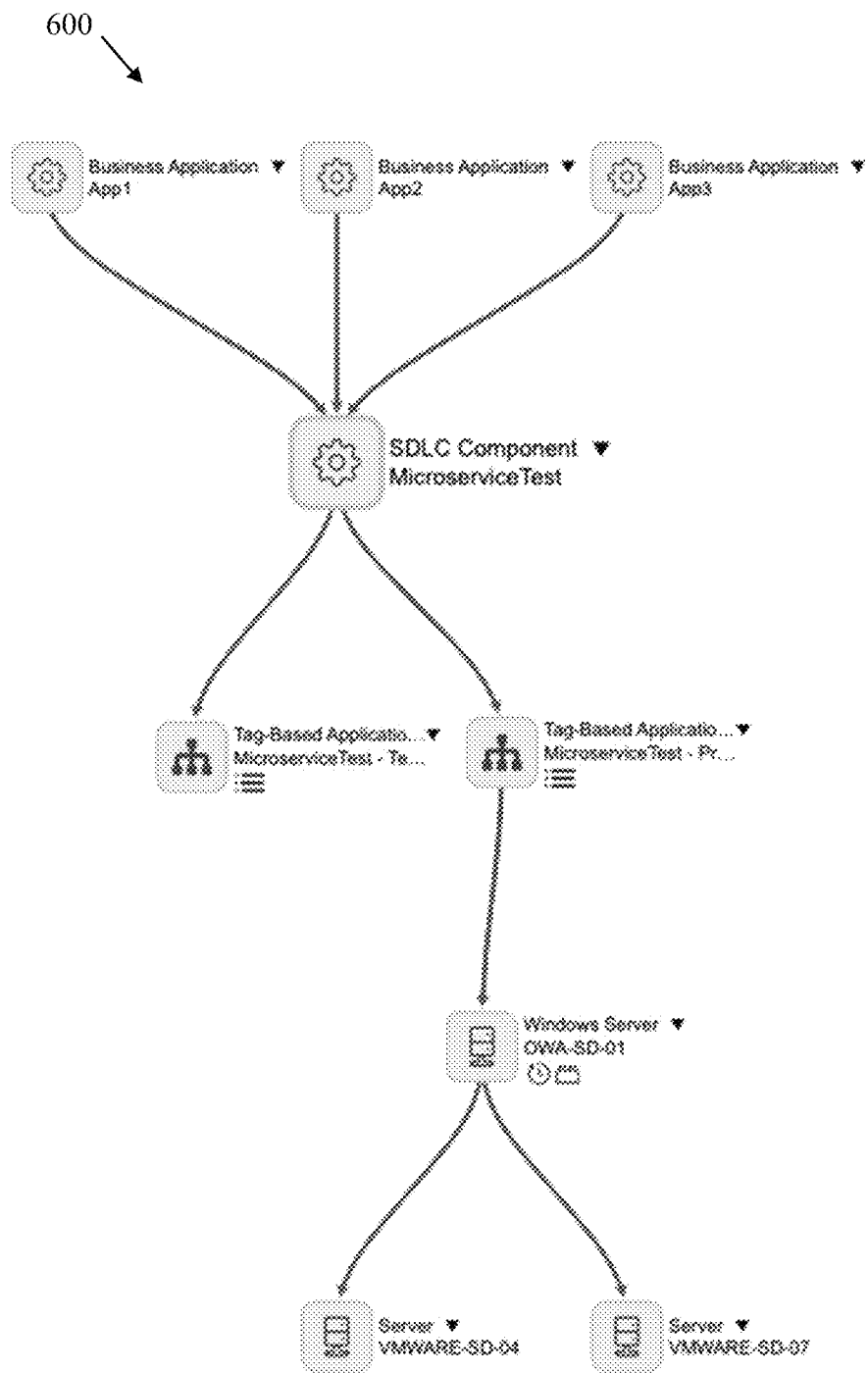
FIG. 6 is an exemplary dependency map associated with the configuration file of FIG. 5.

Referring to FIG. 6, an exemplary dependency map 600 associated with the configuration file of FIG. 5 is illustrated. The service map provides a graphical depiction of the organization of the associated IT infrastructure. In particular, there are three business applications in this example associated with the test microservice Software Development Life Cycle (SDLC) Component, which is associated with two tag-based application services in test and production environments, with the production environment associated with a Windows™ server associated with two software-defined virtual servers. The graphical dependency map 600 could be generated by the platform instance associated with the enterprise upon request from an IT operations user to provide visibility to the IT infrastructure, as defined or modified based on the configuration file 500.

Referring back to FIG. 4, after receiving the BLOB, the PaaS server device 112 processes the BLOB file contents to validate a schema, confirm the presence of mandatory fields, and convert the BLOB to a JSON format that is compatible with the platform instance hosted by the PaaS server device 112. Additionally, the PaaS server device parses the resulting configuration file to identify particular fields and associated configuration data and update a database, which is a CMDB in this particular example, according to the configuration data. Optionally, the PaaS server device 112 also generates and sends notification(s) regarding the configuration update based on stored contact information.

Accordingly, as described and illustrated by way of the examples herein, this technology advantageously facilitates automated configuration updates, reflected in an on-premises version control system repository, on an enterprise platform instance without requiring user login to the platform instance of any manual entry (e.g., into form fields) of the configuration data. Thereby, this technology more efficiently and effectively updates a configuration database in a more accurate, comprehensive, and automated manner to facilitate improved downstream utility of the database, such as for visibility into enterprise IT infrastructure, for example.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for automated configuration management in platform-as-a-service (PaaS) environments, the method implemented by one or more PaaS server devices and comprising:
   polling a version control system, via one or more communication networks and an application programming interface (API) for the version control system, for commit metadata, wherein the one or more communication networks comprise a wide area network;
   obtaining the commit metadata via the one or more communication networks and from an endpoint corresponding to a uniform resource locator (URL) of a webhook triggered at the version control system following a commit by one or more enterprise users of one or more files to a repository of the version control system, wherein the version control system is located on-premises and is associated with an enterprise and the commit metadata comprises an indication of the one or more files;
   determining that at least a portion of the indication for at least a configuration file of the one or more files matches a stored pattern;
   retrieving contents of the configuration file from the version control system via the one or more communication networks, wherein the contents comprise configuration data associated with information technology infrastructure associated with the enterprise;
   processing the configuration data of the configuration file to:
      extract one or more tags to facilitate tag-based service mapping, wherein each of the one or more tags comprises a key/value pair; or
      generate another one or more tags based on:
         a match of stored key data with one or more configuration items extracted from the configuration file; and
         one or more environments corresponding to the matched key data; and
   updating a database associated with an instance of a platform to include at least a portion of the processed configuration data, wherein the platform instance is associated with the enterprise and hosted within a PaaS environment.

2. The method of claim 1, wherein the at least a portion of the indication comprises one or more of a file name or a file extension, the configuration file comprises a data-serialization language file, the contents of the configuration file comprise a binary large object (BLOB), and the method further comprises retrieving the BLOB via the one or more communication networks using the application programming interface (API) for the version control system.

3. The method of claim 1, further comprising generating and sending one or more notifications to at least one of the one or more enterprise users or another one or more enterprise users based on stored contact information after updating the database, wherein the one or more notifications comprise confirmation data associated with the database update.

4. The method of claim 1, further comprising further processing the configuration data of the configuration file to:

validate a schema of the configuration file; or determine whether one or more mandatory fields are present in the configuration file.

5. A non-transitory computer readable medium having stored thereon instructions for automated configuration management in platform-as-a-service (PaaS) environments comprising executable code that, when executed by one or more processors, causes the one or more processors to:

poll a version control system, via one or more communication networks and an application programming interface (API) for the version control system, for commit metadata, wherein the one or more communication networks comprise a wide area network;

obtain the commit metadata via the one or more communication networks and from an endpoint corresponding to a uniform resource locator (URL) of a webhook triggered at the version control system following a commit by one or more enterprise users of one or more files to a repository of the version control system, wherein the version control system is located on-premises and is associated with an enterprise and the commit metadata comprises an indication of the one or more files;

determine that at least a portion of the indication for at least a configuration file of the one or more files matches a stored pattern;

retrieve contents of the configuration file from the version control system via the one or more communication networks, wherein the contents comprise configuration data associated with information technology infrastructure associated with the enterprise;

process the configuration data of the configuration file to:
extract one or more tags to facilitate tag-based service mapping, wherein each of the one or more tags comprises a key/value pair; or
generate another one or more tags based on:
a match of stored key data with one or more configuration items extracted from the configuration file; and
one or more environments corresponding to the matched key data; and update a database associated with an instance of a platform to include at least a portion of the processed configuration data, wherein the platform instance is associated with the enterprise and hosted within a PaaS environment.

6. The non-transitory computer readable medium of claim 5, wherein the at least a portion of the indication comprises one or more of a file name or a file extension, the configuration file comprises a data-serialization language file, the contents of the configuration file comprise a binary large object (BLOB), and the executable code, when executed by the one or more processors, further causes the one or more processors to retrieve the BLOB via the one or more communication networks using the application programming interface (API) for the version control system.

7. The non-transitory computer readable medium of claim 5, wherein the executable code, when executed by the one or more processors, further causes the one or more processors to generate and send one or more notifications to at least one of the one or more enterprise users or another one or more enterprise users based on stored contact information after updating the database, wherein the one or more notifications comprise confirmation data associated with the database update.

8. The non-transitory computer readable medium of claim 5, wherein the executable code, when executed by the one or more processors, further causes the one or more processors to further process the configuration data of the configuration file to:

validate a schema of the configuration file; or determine whether one or more mandatory fields are present in the configuration file.

9. A platform-as-a-service (PaaS) server device, comprising memory comprising programmed instructions stored thereon and one or more processors configured to execute the stored programmed instructions to:

poll a version control system, via one or more communication networks and an application programming interface (API) for the version control system, for commit metadata, wherein the one or more communication networks comprise a wide area network;

obtain the commit metadata via the one or more communication networks and from an endpoint corresponding to a uniform resource locator (URL) of a webhook triggered at the version control system following a commit by one or more enterprise users of one or more files to a repository of the version control system, wherein the version control system is located on-premises and is associated with an enterprise and the commit metadata comprises an indication of the one or more files;

determine that at least a portion of the indication for at least a configuration file of the one or more files matches a stored pattern;

retrieve contents of the configuration file from the version control system via the one or more communication networks, wherein the contents comprise configuration data associated with information technology infrastructure associated with the enterprise;

process the configuration data of the configuration file to:
extract one or more tags to facilitate tag-based service mapping, wherein each of the one or more tags comprises a key/value pair; or
generate another one or more tags based on:
a match of stored key data with one or more configuration items extracted from the configuration file; and
one or more environments corresponding to the matched key data; and update a database associated with an instance of a platform to include at least a portion of the processed configuration data, wherein the platform instance is associated with the enterprise and hosted within a PaaS environment.

10. The PaaS server device of claim 9, wherein the at least a portion of the indication comprises one or more of a file name or a file extension.

11. The PaaS server device of claim 9, wherein the configuration file comprises a data-serialization language file and contents of the configuration file comprise a binary large object (BLOB).

12. The PaaS server device of claim 11, wherein the one or more processors are further configured to execute the stored programmed instructions to retrieve the BLOB via the one or more communication networks using the application programming interface (API) for the version control system.

13. The PaaS server device of claim 9, wherein the one or more processors are further configured to execute the stored programmed instructions to generate and send one or more notifications to at least one of the one or more enterprise users or another one or more enterprise users based on stored contact information after updating the database, wherein the one or more notifications comprise confirmation data associated with the database update.

14. The PaaS server device of claim 9, wherein the one or more processors are further configured to execute the stored programmed instructions to further process the configuration data of the configuration file to:
   validate a schema of the configuration file;
   determine whether one or more mandatory fields are present in the configuration file.

* * * * *